US011039293B2

(12) United States Patent
Buck et al.

(10) Patent No.: US 11,039,293 B2
(45) Date of Patent: Jun. 15, 2021

(54) METHOD AND DEVICES FOR TRANSMITTING A SECURED DATA PACKAGE TO A COMMUNICATION DEVICE

(71) Applicant: LEGIC Identsystems AG, Wetzikon (CH)

(72) Inventors: Martin Buck, Zug (CH); Peter Plüss, Tann (CH); Marcel Plüss, Tann (CH)

(73) Assignee: LEGIC Identsystems AG, Wetzikon (CH)

( * ) Notice: Subject to any disclaimer, the term of this patent is extended or adjusted under 35 U.S.C. 154(b) by 0 days.

(21) Appl. No.: 16/724,737

(22) Filed: Dec. 23, 2019

(65) Prior Publication Data

US 2020/0128381 A1 Apr. 23, 2020

Related U.S. Application Data

(63) Continuation of application No. 15/693,656, filed on Sep. 1, 2017, now Pat. No. 10,555,154.

(30) Foreign Application Priority Data

Sep. 6, 2016 (CH) ...................................... 01149/16

(51) Int. Cl.
*H04W 4/80* (2018.01)
*H04L 29/06* (2006.01)
(Continued)

(52) U.S. Cl.
CPC ............... *H04W 4/80* (2018.02); *H04L 63/08* (2013.01); *H04L 63/107* (2013.01);
(Continued)

(58) Field of Classification Search
CPC ....... H04L 9/08; H04L 9/0819; H04L 9/0827; H04L 63/061; H04L 63/107;
(Continued)

(56) References Cited

U.S. PATENT DOCUMENTS 8,943,605 B1 1/2015 Martin et al.
9,485,607 B2 11/2016 Aarnio
(Continued)

OTHER PUBLICATIONS

Nov. 16, 2016 (CH)—International Search Report—Intl App 1149/16.

*Primary Examiner* — Devan A Sandiford
(74) *Attorney, Agent, or Firm* — Banner & Witcoff, Ltd.

(57) ABSTRACT

For transmitting a secured data package from a computer system to a short-range communication device, the secured data package is transmitted from the computer system via a mobile radio network to a mobile communication apparatus. The mobile communication apparatus is placed in the communication range of the short-range communication device and receives from the short-range communication device a data read request, which includes device location information. The mobile communication apparatus determines the current location of the mobile communication apparatus. In case of correspondence of the current apparatus location with the received device location information, the mobile communication apparatus determines positive access authorization and transfers the secured data package to the short-range communication device.

22 Claims, 4 Drawing Sheets

(51) Int. Cl.
*H04W 4/02* (2018.01)
*H04W 4/021* (2018.01)
*H04W 12/63* (2021.01)
*H04W 12/06* (2021.01)
*H04W 12/08* (2021.01)

(52) U.S. Cl.
CPC ............ *H04W 4/025* (2013.01); *H04W 4/021* (2013.01); *H04W 12/06* (2013.01); *H04W 12/08* (2013.01); *H04W 12/63* (2021.01)

(58) Field of Classification Search
CPC ...... H04L 63/062; H04W 4/02; H04W 4/025; H04W 48/04; H04W 4/008; H04W 4/80
See application file for complete search history.

(56) References Cited

U.S. PATENT DOCUMENTS

| | | |
|---|---|---|
| 9,503,965 B2 | 11/2016 | Dhanabalan et al. |
| 2006/0224901 A1 | 10/2006 | Lowe |
| 2007/0162971 A1 | 7/2007 | Blom et al. |
| 2010/0185856 A1* | 7/2010 | Alam ...................... H04L 63/08 713/168 |
| 2012/0079045 A1* | 3/2012 | Plotkin .................... H04L 51/24 709/206 |
| 2012/0117169 A1* | 5/2012 | Plotkin .................... H04L 51/36 709/206 |
| 2012/0117568 A1* | 5/2012 | Plotkin .................... H04L 51/00 718/100 |
| 2012/0157052 A1 | 6/2012 | Quade |
| 2012/0182145 A1 | 7/2012 | Jameson et al. |
| 2012/0221464 A1 | 8/2012 | Pasquero et al. |
| 2012/0264375 A1 | 10/2012 | Shankaranarayanan |
| 2013/0015947 A1 | 1/2013 | Best |
| 2013/0096821 A1 | 4/2013 | Wong et al. |
| 2013/0097269 A1* | 4/2013 | Plotkin ............. H04M 1/72547 709/206 |
| 2014/0007209 A1 | 1/2014 | Zucker |
| 2014/0049361 A1 | 2/2014 | Ahearn et al. |
| 2014/0127992 A1 | 5/2014 | Kuscher et al. |
| 2014/0142934 A1 | 5/2014 | Kim |
| 2014/0211666 A1 | 7/2014 | Gillett |
| 2014/0218241 A1 | 8/2014 | Bernhardt et al. |
| 2014/0219262 A1 | 8/2014 | Sun et al. |
| 2014/0282846 A1 | 9/2014 | DeWeese et al. |
| 2014/0298013 A1* | 10/2014 | Knudsen ................... H04L 9/00 713/167 |
| 2015/0369900 A1 | 12/2015 | Pan et al. |
| 2015/0382196 A1 | 12/2015 | Hillier et al. |
| 2016/0050066 A1 | 2/2016 | Loizides |
| 2016/0248738 A1 | 8/2016 | Brandsma et al. |
| 2017/0034253 A1* | 2/2017 | Jiang ....................... H04L 67/10 |
| 2018/0014168 A1 | 1/2018 | Lau et al. |
| 2018/0275980 A1 | 9/2018 | Bershansky et al. |
| 2019/0258949 A1 | 8/2019 | Reyes et al. |

* cited by examiner

METHOD AND DEVICES FOR TRANSMITTING A SECURED DATA PACKAGE TO A COMMUNICATION DEVICE

CROSS REFERENCE TO RELATED APPLICATIONS

The present application is a continuation application of U.S. application Ser. No. 15/693,656, filed Sep. 1, 2017, which claims benefit of Switzerland Patent Application No. 01149/16, filed Sep. 6, 2016, the disclosures of which are each incorporated herein by reference in their entirety.

FIELD OF THE TECHNOLOGY

The present disclosure relates to a method and devices for transmitting a secured data package from a computer system to a short-range communication device. Specifically, the present disclosure relates to a mobile communication apparatus, a short-range communication device, and a method of transmitting a secured data package from a computer system to the short-range communication device.

BACKGROUND

For many years, electronic terminal devices have been installed and used in access control systems in connection with passive RFID transponders (Radio Frequency Identifier). The electronic terminal devices were configured as short-range communication devices and included RFID readers for reading in a wireless fashion access rights or at least user identifiers from RFID transponders to control access to an access controlled area, such as a building or a room, or to access controlled objects, such as a car or goods in a vending machine, etc. With the arrival of mobile radio phones (cellular phones, smart phones) that included active RFID-based communication interfaces, so called NFC interfaces (Near Field Communication), it became possible to use such mobile communication apparatuses as carriers of access rights rather than passive RFID transponders in form of RFID cards, dongles, or the like. Both operators and users of access control systems welcomed the provision of mobile communication apparatuses with radio-based communication modules for establishing local or direct wireless communication links with short-range communication devices, because it was no longer necessary to use special purpose RFID transponders in form of RFID cards, dongles, or the like. Furthermore, the mobile communication apparatuses included other communication interfaces for short-range communication, such as Bluetooth (BT) or Bluetooth Low Energy (BLE), which lead to the short-range communication devices being additionally equipped with such further communication interfaces to improve flexibility and versatility. Nevertheless, while the use of mobile communication apparatuses and improved flexibility and versatility of short-range communication devices further increased the number of applications and installations of short-range communication devices, the secure management and control of access rights and credentials for the short-range communication devices remained a challenge and, typically, required laborious and costly wiring of the terminals to back-end systems. Moreover, so called stand-alone or off-line terminals without communication links to back-end systems are difficult to maintain and keep up to date with the frequent software upgrades and hardware innovations of mobile phones, in particular, and the short product life cycles customary in the world of consumer electronic products, in general.

SUMMARY

This disclosure provides a method and devices for transmitting a secured data package from a computer system to a short-range communication device, which method and devices do not have at least some of the disadvantages of the prior art.

Aspects of the present disclosure are described through the features of the independent claims. In addition, further aspects follow from the dependent claims and the description.

A mobile communication apparatus comprises a first circuit configured for data communication via a mobile radio network, a second circuit configured for short-range communication with a short-range communication device, and a third circuit configured to determine apparatus location information, indicative of a current location of the mobile communication apparatus.

According to the present disclosure, the mobile communication apparatus further comprises a processor connected to the first, second, and third circuits, and configured to receive via the mobile radio network a secured data package from a computer system, to receive device location information from the short-range communication device, to determine access authorization based on verifying correspondence of the device location information and the apparatus location information, determining affirmative access authorization in case of correspondence of the device location information and the apparatus location information, and determining negative access authorization in lack of correspondence of the device location information and the apparatus location information, and to transfer the secured data package to the short-range communication device, in case of affirmative access authorization, and to not transfer the secured data package to the short-range communication device, in case of negative access authorization. Using a mobile communication apparatus as a communication intermediary makes it possible to transfer a secured data package from a computer system to short-range communication device, which has no direct connectivity to the computer system. The secured data package can be transferred to the short-range communication device in on-line mode, when the mobile communication apparatus has connectivity to the computer system, and in off-line mode, when the mobile communication has no connectivity to the computer system. By verifying in the mobile communication apparatus correspondence of the location of the mobile communication apparatus with location information of the short-range communication device, the transfer of the secured data package (or of any other confidential or critical data for that matter) from the mobile communication apparatus to the short-range communication device can be prevented in compromised scenarios where the (unwired) short-range communication device has been fraudulently moved to another location or mistakenly installed in a location that does not correspond to the device location stored in the short-range communication device. Moreover, the secured data package (including cryptographic keys, configuration data or any other confidential or critical data) can be distributed to short-range communication devices via a multitude of different communication technologies, e.g. RFID, NFC, WLAN, BT, BLE, etc.

In an embodiment, the device location information is received from the short-range communication device included in a data read request, and the processor is configured to reject the read request, in case of negative access authorization.

In an embodiment, the secured data package is received with target location information, and the processor is configured to determine the access authorization further based on verifying correspondence of the device location information and the target location information, determining affirmative access authorization in case of correspondence of the device location information and the target location information, and determining negative access authorization in lack of correspondence of the device location information and the target location information.

In a further embodiment, the processor is configured to further receive device time information from the short-range communication device, e.g. included in the data read request, and to determine the access authorization further based on verifying correspondence of the device time information and time information stored in the mobile communication apparatus, determining affirmative access authorization in case of correspondence of the device time information and time information stored in the mobile communication apparatus, and determining negative access authorization in lack of correspondence of the device time information and time information stored in the mobile communication apparatus.

In an embodiment, the secured data package includes one or more secret access keys, one or more access rights, configuration data for the short-range communication device, and/or time information, and the processor is configured to transfer the secured data package including the one or more secret access keys, the one or more access rights, the configuration data, and/or time information, respectively, to the short-range communication device, in case of affirmative access authorization, and to not transfer the secured data package to the short-range communication device, in case of negative access authorization.

In an embodiment, the processor is configured to execute authentication and access control protocols, which govern authentication and access control between the mobile communication apparatus and the short-range communication device, for accessing the short-range communication device to set the device location information in the short-range communication device, and, in case of affirmative authentication and access control, to use the apparatus location information to set the device location information in the short-range communication device.

In a further embodiment, the processor is configured to execute authentication and access control protocols, which govern authentication and access control between the mobile communication apparatus and the short-range communication device, for accessing the mobile communication apparatus, using one or more secret access keys and/or access rights, to perform at least one of: reading data from a secured data store of the mobile communication apparatus, writing data into the secured data store, and interacting with a secured application of the mobile communication apparatus.

In addition to the mobile communication apparatus, the present disclosure also relates to a short-range communication device, which comprises a circuit configured for short-range communication with a mobile communication apparatus and a processor connected to the circuit. The processor is configured to receive from the mobile communication apparatus a data package. The data package includes apparatus location information, indicative of a current location of the mobile communication apparatus. The processor is further configured to determine access authorization based on verifying correspondence of device location information stored in the short-range communication device and the apparatus location information received from the mobile communication apparatus, determining affirmative access authorization in case of correspondence of the device location information and the apparatus location information, and determining negative access authorization in lack of correspondence of the device location information and the apparatus location information. The processor is further configured to determine and store in the short-range communication device a content of the data package received from the mobile communication apparatus, in case of affirmative access authorization, and to reject the data package, in case of negative access authorization. By verifying in the short-range communication device correspondence of the location of the mobile communication apparatus with location information of the short-range communication device, the acceptance of the data package from the mobile communication apparatus can be prevented in compromised scenarios where the mobile communication apparatus is located in another location than specified and stored in the short-range communication device, e.g. because of a remote, extended interface attack, or because of an installation of the short-range communication device in an erroneous location.

In an embodiment, the processor is configured to receive from the mobile communication apparatus time information, and to determine the access authorization further based on verifying correspondence of device time information stored in the short-range communication device and the time information received from the mobile communication apparatus, determining affirmative access authorization in case of correspondence of the device time information and the time information received from the mobile communication apparatus, and determining negative access authorization in lack of correspondence of the device time information and the time information received from the mobile communication apparatus.

In a further embodiment, the processor is configured to extract from the secured data package one or more secret access keys, one or more access rights, configuration data for the short-range communication device, and/or time information; and to store in a secured data store of the short-range communication device the one or more secret access keys, the one or more access rights, the configuration data, and/or the time information, respectively.

In an embodiment, the processor is configured to execute authentication and access control protocols, which govern authentication and access control between the short-range communication device and the mobile communication apparatus, for accessing the short-range communication device to set the device location information in the short-range communication device, and, in case of affirmative authentication and access control, to receive from the mobile communication apparatus the apparatus location information, and to set the device location information in the short-range communication device using the apparatus location information.

In a further embodiment, the processor is configured to execute authentication and access control protocols, which govern authentication and access control between the short-range communication device and the mobile communication apparatus, for accessing the mobile communication apparatus, using one or more secret access keys and/or access rights, to perform reading data from a secured data store of the mobile communication apparatus, writing data into the secured data store, and/or interacting with a secured application of the mobile communication apparatus.

In addition to the mobile communication apparatus and the short-range communication device, the present disclosure also relates to a method of transmitting a secured data package from a computer system to a short-range communication device. The method comprises: transmitting the secured data package from the computer system via a mobile radio network to a mobile communication apparatus; placing the mobile communication apparatus in a communication range of the short-range communication device; determining an access authorization based on verifying correspondence of apparatus location information, indicative of a current location of the mobile communication apparatus, and device location information stored in the short-range communication device, determining affirmative access authorization in case of correspondence of the apparatus location information and the device location information, and determining negative access authorization in lack of correspondence of the apparatus location information and the device location information; and, in case of affirmative access authorization, transferring the secured data package to the short-range communication device and determining and storing in the short-range communication device a content of the data package received from the mobile communication apparatus.

In an embodiment, the method further comprises: receiving in the mobile communication apparatus a data read request from the short-range communication device, the data read request including the device location information; determining in the mobile communication apparatus the apparatus location information; determining in the mobile communication apparatus a first authorization of access based on the device location information received from the short-range communication device and the apparatus location information; and transferring the secured data package from the mobile communication apparatus to the short-range communication device, in case of affirmative first authorization of access, or rejecting the read request, in case of negative first authorization of access.

In a further embodiment, the method further comprises: receiving in the short-range communication device the apparatus location information from the mobile communication apparatus; determining in the short-range communication device a second authorization of access based on the device location information stored in the short-range communication device and the apparatus location information received from the mobile communication apparatus; and determining and storing in the short-range communication device the content of the secured data package received from the mobile communication apparatus, in case of affirmative second authorization of access, or rejecting the data package, in case of negative second authorization of access.

The present disclosure also relates to a method of transmitting a secured data package from a computer system to a short-range communication device, whereby the method comprises: transmitting the secured data package from the computer system via a mobile radio network to a mobile communication apparatus; placing the mobile communication apparatus in a communication range of the short-range communication device; receiving in the mobile communication apparatus device location information from the short-range communication device, e.g. included in a data read request from the short-range communication device; determining in the mobile communication apparatus apparatus location information indicative of a current location of the mobile communication apparatus; determining in the mobile communication apparatus a first authorization of access based on the device location information received from the short-range communication device and the apparatus location information, determining affirmative first authorization of access in case of correspondence of the apparatus location information and the device location information, and determining negative first authorization of access in lack of correspondence of the apparatus location information and the device location information; transferring the secured data package from the mobile communication apparatus to the short-range communication device, in case of affirmative first authorization of access, or rejecting the read request, in case of negative first authorization of access; receiving in the short-range communication device the apparatus location information from the mobile communication apparatus; determining in the short-range communication device a second authorization of access based on the device location information stored in the short-range communication device and the apparatus location information received from the mobile communication apparatus, determining affirmative second authorization of access in case of correspondence of the apparatus location information and the device location information, and determining negative second authorization of access in lack of correspondence of the apparatus location information and the device location information; and determining and storing in the short-range communication device the content of the secured data package received from the mobile communication apparatus, in case of affirmative second authorization of access, or rejecting the data package, in case of negative second authorization of access.

BRIEF DESCRIPTION OF THE DRAWINGS

The present disclosure will be explained in more detail, by way of example, with reference to the drawings in which.

DETAILED DESCRIPTION

Figure 1:
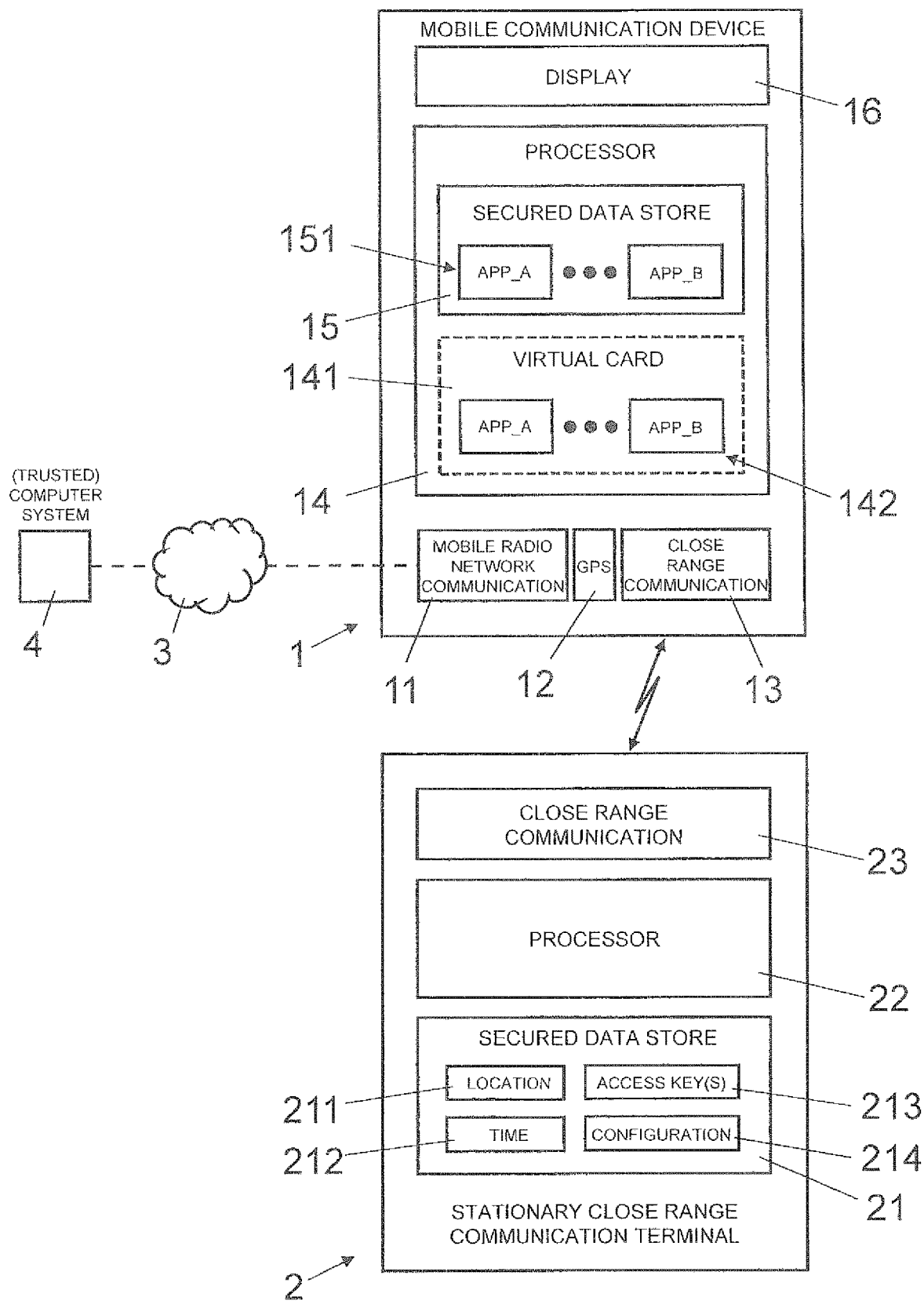
FIG. 1 shows a block diagram illustrating schematically a mobile communication apparatus configured to transfer a secured data package from a computer system to a short-range communication device.

In FIGS. 1-5, reference numeral 1 refers to a mobile communication apparatus which is implemented as mobile radio telephone (smart phone, smart watch) or a mobile computer such as a tablet computer, a PDA (personal data assistant) or a portable personal computer.

As illustrated in FIG. 1, the mobile communication apparatus 1 comprises a circuit configured for mobile radio network communication 11, a circuit configured for short-range communication 13 with a short-range communication device 2, and a circuit configured to determine apparatus location information 12 indicative of the current location of the mobile communication apparatus 1. One skilled in the art will understand that two or more of these circuits can be implemented as one common circuit or they can be implemented as separate circuits.

The short-range communication circuit 13 is configured for short-range bidirectional data communication with a short-range communication device 2. The short-range communication circuit 13 comprises an RFID transceiver (Radio Frequency Identifier), an NFC transceiver (Near Field Communication), a BLE transceiver (Bluetooth Low Energy), and/or a WLAN (Wi-Fi) transceiver. For example, the short-range communication circuit 13 is configured to interact with a contactless device according to a standardized RFID protocol as defined in standards such as ISO 18092, ISO 15693, or ISO 14443, or according to a proprietary data transmission or RFID protocol. For example, the short-range communication circuit 13 is configured to operate at a carrier frequency in the range of 100 KHz to 2.5 GHz; particularly, the carrier frequency is set to the working frequency of an RFID system, e.g. 6.78 MHz, 13.56 MHz, or 27.12 MHz (or another multiple of 13.56 MHz).

The mobile radio network communication circuit 11 is configured for data communication with a remote computer system 4 via a mobile radio network 3. The mobile radio network communication circuit 11 is configured for BT (Bluetooth), BLE (Bluetooth Low Energy), WLAN (Wireless Local Area Network), GSM (Global System for Mobile Communications), UMTS (Universal Mobile Telecommunications System) and/or other mobile radio data communication services. Accordingly, the mobile radio network 3 comprises a WLAN, a GSM network, an UMTS network, another mobile radio data communication network, and/or the Internet.

The apparatus location determination circuit 12 is configured to determine the current location of the mobile communication apparatus 1. The apparatus location determination circuit 12 comprises a receiver for satellite-based navigation, e.g. a GPS receiver (Global Positioning System). Alternatively or in addition, the apparatus location determination circuit 12 is configured to determine the location of the mobile communication apparatus 1 using network data from the mobile radio network 3.

As illustrated in FIG. 1, the mobile communication apparatus 1 further comprises a processor 14, a secured data store 15, and a display 16. The processor 14 is connected to the mobile radio network communication circuit 11, the apparatus location determination circuit 12, the short-range communication circuit 13, the secured data store 15, and the display 16.

In an embodiment, the processor 14 is configured (programmed) to implement a virtual card 141. Specifically, the virtual card 141 is implemented as a programmed software module comprising computer program code which is stored on a non-transient computer-readable medium and configured to control the processor 14 directly, by way of processor-specific instructions, or by way of interpretable instructions via an (intermediate) hardware abstraction layer, e.g. a virtual machine platform such as Java Virtual Machine (JVM) or a Java Card Open Platform (JCOP) as specified by the GlobalPlatform association. In an alternative embodiment, the virtual card 141 is implemented by way of VHDL (Very High Speed Integrated Circuit Hardware Description Language) or VHSIC Hardware Description Language running on a VHDL Simulator, which is implemented on processor 14.

The virtual card 141 is configured to emulate the functions of a hardware-implemented smart card, i.e. a chip card or integrated circuit card comprising a processor and memory (RAM, ROM), for example an RFID card for interacting with a card reader according to a standardized RFID protocol as defined in standards such as ISO 18092, ISO 21481, ISO 15693, or ISO 14443, or according to a proprietary data transmission or RFID protocol.

In FIG. 1, reference numeral 142 refers to different applications APP_A, APP_B. In an embodiment, the applications APP_A, APP_B are implemented as card applications APP_A, APP_B of the virtual card 141. The applications 142 are implemented as programmed software modules comprising computer program code, which is stored on a non-transient computer-readable medium and configured to control the processor 12 directly, by way of processor-specific instructions, or by way of interpretable instructions via the hardware abstraction layer.

The processor 14 or virtual card 141, respectively, is configured to control access and execution of the (card) applications 142, e.g. in adherence to respective standards and specifications for non-virtual (real) smart card modules. For example, access and execution of the (card) applications 142 are controlled in accordance with specifications defined by the GlobalPlatform association for managing applications, the MULTOS (Multi Operating System) security standard for smart cards defined by the MULTOS Consortium, TCOS (TeleSec Chipcard Operating System) defined by T-Systems International GmbH of Deutsche Telekom AG, the EMV standard defined by Europay International (now MasterCard Europe), MasterCard and VISA, or MTSC (Master-Token System Control) defined by LEGIC Identsystems AG.

Reference numeral 151 refers to application data for the different applications APP_A, APP_B, which is stored in the secured data store 15 and is accessible only to the respective applications APP_A, APP_B; for example, the data is card data for different card applications of the processor 14 or the virtual card 141.

As illustrated in FIG. 1, the short-range communication device 2 comprises a short-range communication circuit 23 configured for short-range data exchange with the mobile communication apparatus 1, e.g. a range of several centimeters or several meters. Accordingly, the short-range communication circuit 23 comprises an RFID transceiver, an NFC transceiver, a BLE transceiver, and/or a WLAN (Wi-Fi) transceiver compatible to the short-range communication circuit 13 of the mobile communication apparatus 1. The short-range communication device 2 further comprises a secured data store 21 and a processor 22 connected to the short-range communication circuit 23 and the secured data store 21. The secured data store 21 is accessible only for the processor 22 of the short-range communication device 2.

In an embodiment, the short-range communication device 2 is embodied as an integrated circuit, i.e. a chip. In an embodiment, the short-range communication device 2 is implemented as a card reader, e.g. a card reader for interacting with a device according to a standardized RFID protocol as defined in standards such as ISO 18092, ISO 21481, ISO 15693, or ISO 14443, or according to a proprietary data transmission or RFID protocol.

The computer system 4 comprises one or more computers with one or more processors configured to communicate with the mobile communication apparatus 1 via mobile radio network 3. The computer system 4 is a trusted entity and, depending on the embodiment and/or scenario, the computer system 4 is implemented as a computer center, a fixed computer, a mobile communication apparatus (as described above in the context of mobile communication apparatus 1), or a short-range communication device (as described above in the context of short-range communication device 2). In a scenario, the computer system 4 is used in connection (temporarily, removable or fixed) with a smart card having stored therein secured data for distribution by the computer system 4. The computer system 4 is configured as a computerized access rights authority. The computer system 4 or the computerized access rights authority, respectively, is configured to store and manage cryptographic keys and/or access rights for accessing (smart) cards, including smart cards implemented by processor 14, e.g. as virtual cards 141. The cryptographic keys and/or access rights define for an identified smart card, the rights to read data from the smart card, write data into the smart card, and interact with a specific application of the smart card.

In the following paragraphs, exemplary sequences of steps performed by the computer system 4, the mobile communication apparatus 1, and the short-range communication device 2 are described with reference to FIGS. 2 to 5.

Figure 2:
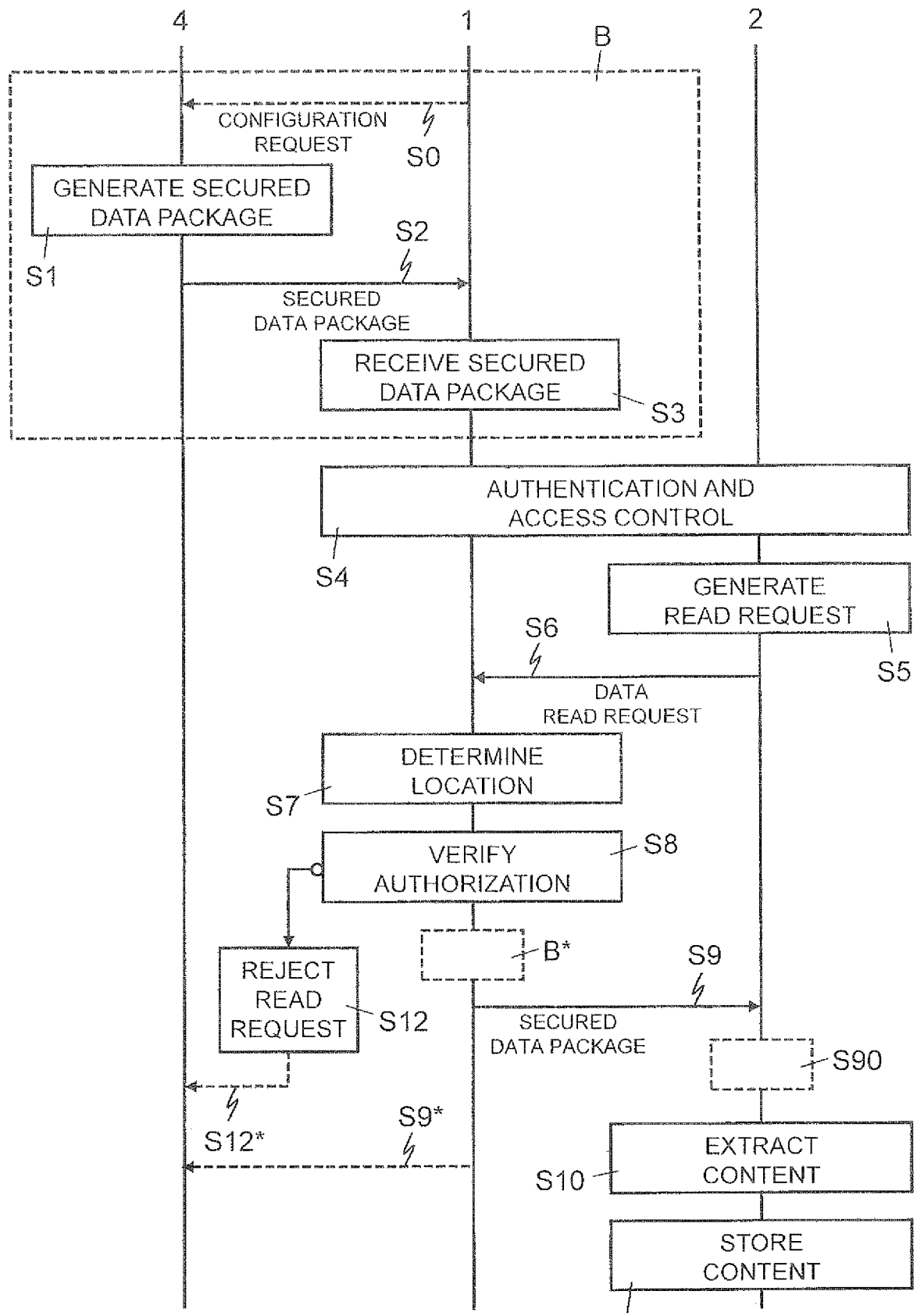
FIG. 2 shows a flow diagram illustrating an exemplary sequence of steps for transmitting a secured data package from a computer system to a short-range communication device.

FIG. 2 illustrates an exemplary sequence of steps for transmitting a secured data package from the computer system 4 to the short-range communication device 2. As will be described below in more detail, the secured data package is transmitted from the computer system 4 via the mobile communication apparatus 1 to the short-range communication device 2. Depending on user selection, application scenario, and or configuration settings, the secured data package is transmitted in online-mode or in off-line mode. In on-line mode, the mobile communication apparatus 1 has connectivity via mobile radio network 3 to the computer system 4 and operates as an intermediary or relay entity for the computer system 4 to transfer the secured data package to the short-range communication device 2, while the mobile communication apparatus 1 is connected via mobile radio network 3 to the computer system 4, i.e. on-line. In off-line mode, the mobile communication apparatus 1 operates as a store-and-forward entity, receiving and storing the secured data package from the computer system 4 while there is connectivity via mobile radio network 3 to the computer system 4, and, subsequently—at a later point in time, transferring the stored secured data package to the short-range communication device 2, without having the requirement of connectivity via mobile radio network 3 to the computer system 4, i.e. off-line.

As illustrated in FIG. 2, in the steps of block B, the secured data package is transmitted from the computer system 4 via mobile radio network 3 to the mobile communication apparatus 1.

In optional preparatory step S0, a configuration request is transmitted from the mobile communication apparatus 1 or its processor 14, respectively, to the computer system 4. For example, the configuration request is submitted by an authorized service person who plans to setup and configure one or more specified short-range communication devices 2 to interact with one or more specific (card) applications implemented by processor 14 or installed on smart cards or virtual implementations of smart cards.

In step S1, responsive to the configuration request from the mobile communication apparatus 1, or from another authorized unit or user, or on its own initiative, the computer system 4 generates a secured data package. The data package is secured in that at least some of its contents are encrypted. The encrypted contents of the secured data package can only be decrypted by a recipient with the appropriate decryption means, including decryption algorithm and secret decryption key. The content or payload of the secured data package comprises cryptographic access keys, access rights, configuration data, time information, and/or location information. The configuration data includes values of configuration parameters and/or executable program code. In an embodiment, the secured data package has a hierarchical and/or nested structure, i.e. the contents of a first secured data package, accessible by way of a first decryption key, may include another second secured data package, accessible by way of a different second decryption key. In an embodiment, the secured data package further includes (non-encrypted) or is linked to target or recipient information, including addressing information, identifying the intended recipient(s), e.g. network addresses or device identifiers of one specific or a group of short-range communication device(s), and target location information, specifying a geographic position or area of the intended recipient(s), e.g. coordinates, postal address, and/or descriptive information including floor number, room number or name, device number or name, etc. In an embodiment, the computer system 4 reads the secured data package or its contents from a smart card via an RFID or NFC interface or through a contact-based interface.

In step S2, the secured data package is transmitted from the computer system 4 via the mobile radio network 3 to the mobile communication apparatus 1.

In step S3, the secured data package is received by the mobile communication apparatus 1 or its processor 14, respectively.

In step S4, the mobile communication apparatus 1 enters the communication range of the short-range communication device 2. The short-range communication device 2 detects the presence of the mobile communication apparatus 1 or its processor 14 or virtual card 141, respectively, and authentication and access control is executed between the short-range communication device 2 and the processor 14 or virtual card 141 of the mobile communication apparatus 1 via the short-range communication circuits 13, 23. One skilled in the art will understand that various standardized or proprietary cryptographic algorithms may be used to perform the authentication and access control protocols between the short-range communication device 2 and the mobile communication apparatus 1 or its processor 14 or virtual card 141. The short-range communication device 2 or its processor 22, respectively, and the mobile communication apparatus 1 or its processor 14 or virtual card 141, respectively, are configured to perform the authentication and access control protocols, e.g. in adherence to respective standards and specifications for non-virtual (real) smart card modules, such as ISO 7816 and/or ISO 9798, as described by the GlobalPlatform association.

In step S5, upon successful authentication and authorization, the short-range communication device 2 or its processor 22, respectively, generates a data read request. The data read request includes device location information 211 as stored in the short-range communication device 2, which indicates the (configured/programmed) location of the particular short-range communication device 2. The device location information 211 is stored in the secured data store 21 of the short-range communication device 2. Depending on the scenario or embodiment, the device location information 211 is stored in the secured data store 21 before the short-range communication device 2 is installed, e.g. during manufacturing or configuration process, or through authenticated on-site configuration when it is already installed, as will be explained later in more detail. Typically, the short-range communication device 2 is installed as a stationary short-range communication device 2 and the device location information 211 indicates the configured stationary location of the short-range communication device 2. Nevertheless, depending on the application, e.g. in connection with an automobile, the short-range communication device 2 can be mobile and the device location information 211 indicates the configured stationary location of the short-range communication device 2 where it is permitted to receive secured data packages from an authorized mobile communication apparatus 1, e.g. in a servicing station or area.

In step S6, the data read request is transmitted from the short-range communication device 2 to the mobile communication apparatus 1 via the short-range communication circuits 13, 23.

In step S7, using the apparatus location determination circuit 12, the processor 14 of the mobile communication apparatus 1 determines its current location (in case of a dead spot, the available location determined last is used). In an embodiment, the processor 14 of the mobile communication apparatus 1 checks whether it has stored a secured data package with a target location matching the current location of the mobile communication apparatus 1. If there is no secured data package with matching target location, the processor 14 generates an alert message, informing the user of the mobile communication apparatus 1 that no secured data package is available for the present location; otherwise, the processor 14 proceeds in step S8.

In step S8, the processor 14 of the mobile communication apparatus 1 further verifies the access authorization of the short-range communication device 2 by checking whether the device location information received from the short-range communication device 2 corresponds to the apparatus location determined for the mobile communication apparatus 1. Specifically, the processor 14 checks whether the device location is within a defined zone or area around the apparatus location, e.g. a zone or area with a radius of five, ten, twenty, fifty or a hundred meters around the apparatus location. In an embodiment, height or altitude (location) information is included in the verification.

In an embodiment, the data read request further includes device time information 212 as stored in the short-range communication device 2, and the processor 14 of the mobile communication apparatus 1 further verifies the access authorization by checking whether the device time information received from the short-range communication device 2 corresponds to apparatus time information stored (or derived from a clock) in the mobile communication apparatus 1.

In case the device location is outside the reference zone or area around the apparatus location (or —if applicable—the device time information deviates from the apparatus time information by more than a defined threshold), in step S12, the processor 14 determines negative access authorization and rejects the read request. In an embodiment, the processor 14 generates and transmits in step S12* a negative feedback message to the computer system 4, informing the computer system 4 about the rejection of a read request because of a lack of correspondence of location (and/or time) of the respective short-range communication device 2.

Otherwise, in case the device location is within the reference zone or area around the apparatus location (and —if applicable—the device time information differs from the apparatus time information not more than the defined threshold), in step S9, the processor 14 determines whether the secured data store 15 includes one or more secured data packages having target location information that match the device location. If there is one secured data packages with matching target location, it will be included in the read response to the short-range communication device 2. If there is more than one secured data packages with matching target location, the processor 14 shows on display 16 a list of the secured data packages with matching target location, including further target location information, such as postal address, floor number, room number or name, device number or name, project name, project ID, installation name, etc. The user is then asked to select from the list the secured data package that is intended for the particular short-range communication device 2 where the user is presently located with the mobile communication apparatus 1. If there is no secured data package with matching target location information, the processor 14 determines negative access authorization and rejects the read request as described above in connection with steps S12 and S12*.

As indicated schematically in FIG. 2, in off-line mode the steps of block B are executed prior to the mobile communication apparatus 1 entering the communication range of the short-range communication device 2 and executing authentication and access control protocols. In on-line mode, on the other hand, the steps S0, S1, S2, S3 of block B may be executed at later point in time, for example after authorization has been verified in step S8, as indicated by reference numeral B*. In this case, the processor 14 of the mobile communication apparatus 1 checks, after execution of the steps of block B*, whether it has received a secured data package with a target location matching the current location of the mobile communication apparatus 1. If there is no secured data package with matching target location, the processor 14 generates an alert message, informing the user of the mobile communication apparatus 1 that no secured data package was received for the present location; otherwise, the processor 14 proceeds in step S9.

Further, in step S9, the processor 14 generates and transmits to the short-range communication device 2 a data read response, including the determined and/or selected secured data package, via the short-range communication circuits 13, 23. In an embodiment, in step S9*, the processor 14 generates and transmits a positive feedback message to the computer system 4.

In an embodiment, the secured data package is deleted in the mobile communication apparatus 1 once the mobile communication apparatus 1 is no longer in proximity to the short-range communication device 2, i.e. once the device location is outside the reference zone or area around the apparatus location. For that purpose, the processor 14 is further configured to check correspondence of the previously determined device location and the apparatus location, e.g. at a set time period after transmission of the secured data package in step S9, and to delete the secured data package in case of a lack of correspondence. Alternatively, deletion of the secured data package is initiated remotely by the computer system 4.

Figure 5:
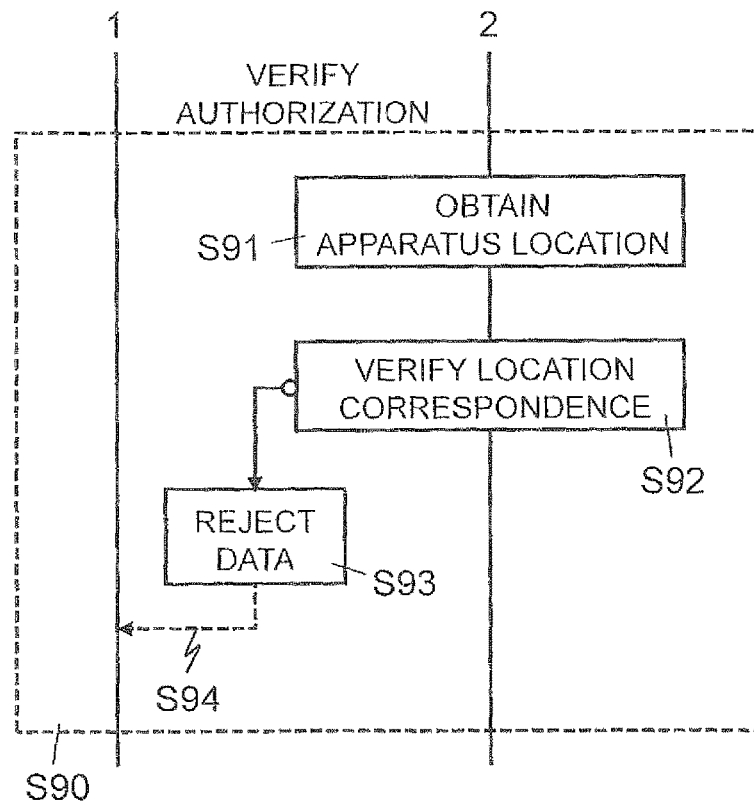
FIG. 5 shows a flow diagram illustrating an exemplary sequence of steps for verifying in a short-range communication device access authorization of a mobile communication apparatus based on location information received from the mobile communication apparatus.

In an embodiment, the processor 14 includes in the data read response the current location of the mobile communication apparatus 1 determined in step S7, and in optional step S90, the processor 22 of the short-range communication device 2 verifies the access authorization of the mobile communication apparatus 1 based on the current location received from the mobile communication apparatus 1. Specifically, as illustrated in FIG. 5, in step S91, the processor 22 obtains the apparatus location information included in the data read response received from the mobile communication apparatus 1. In step S92, the processor 22 verifies location correspondence by checking whether the device location information stored in the short-range communication device 2 corresponds to the apparatus location received from the mobile communication apparatus 1. Thus, the processor 22 checks whether the apparatus location is within a defined zone or area around the device location, e.g. a zone or area with a radius of five, ten, twenty, fifty or a hundred meters around the device location. In an embodiment, height or altitude (location) information is included in the verification.

In an embodiment, the data read response further includes apparatus time included by the processor 14 of the mobile communication apparatus 1, and the processor 22 of the short-range communication device 2 further verifies the access authorization of the mobile communication apparatus 1 by checking whether the apparatus time information received from the mobile communication apparatus 1 corresponds to device time information 212 as stored in the short-range communication device 2, e.g. as programmed or determined by an internal clock of the short-range communication device 2.

In case the apparatus location is outside the reference zone or area around the device location (or —if applicable— the apparatus time information deviates from the device time information by more than a defined threshold), in step S93, the processor 22 determines negative access authorization and rejects the data package from the mobile communication apparatus 1. In an embodiment, the processor 22 generates and transmits in step S94 a negative feedback message to the mobile communication apparatus 1, informing the mobile communication apparatus 1 about the rejection of a data package because of a lack of correspondence of location (and/or time) of the respective mobile communication apparatus 1.

Otherwise, in case the apparatus location is within the reference zone or area around the device location (and —if applicable—the apparatus time information differs from the device time information not more than the defined threshold), the processor 22 of the short-range communication device 2 accepts the data package from the mobile communication apparatus 1 and proceeds in step S10.

In step S10, the processor 22 extracts the encrypted content or payload from the secured data package included in the data read response, using a respective secret cryptographic key for decrypting the respective hierarchy or nesting level of secured data package from the computer system 4.

In step S11, the processor 22 stores the extracted and decrypted content or payload from the secured data package in the secured data store 21 of the short-range communication device 2. Specifically, the processor 22 stores in the secured data store 21 access keys and/or access rights 213, configuration data 214, location information 211, and/or time information 212 extracted and decrypted from the secured data package.

Figure 3:
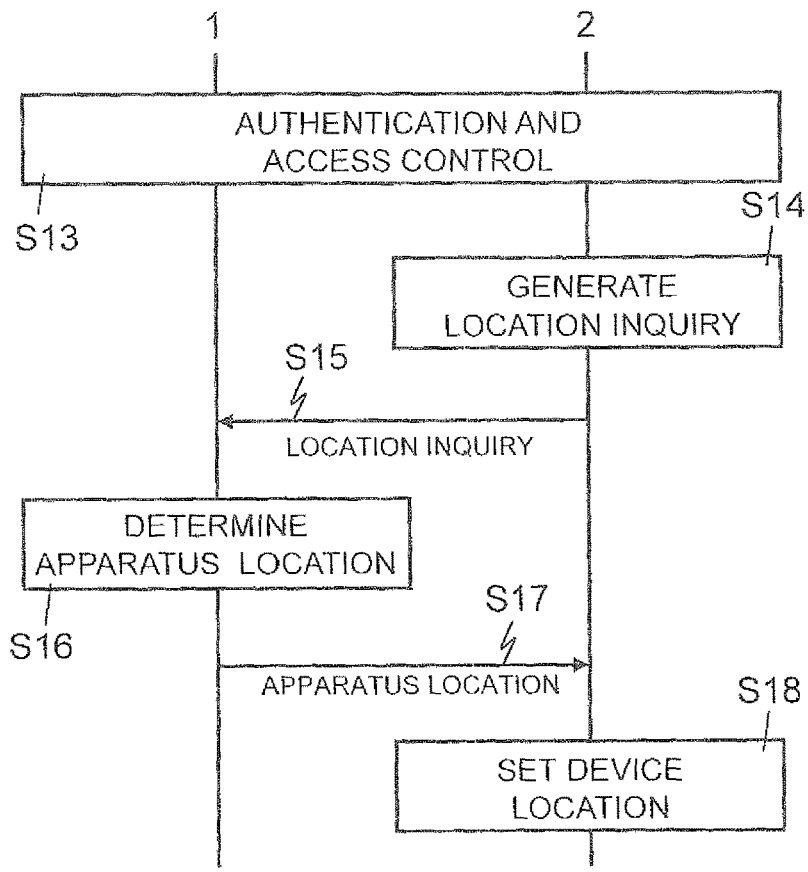
FIG. 3 shows a flow diagram illustrating an exemplary sequence of steps for a mobile communication apparatus setting location information in a short-range communication device.

FIG. 3 illustrates an exemplary sequence of steps for the mobile communication apparatus 1 setting device location information in the short-range communication device 2.

In step S13, the mobile communication apparatus 1 is located inside the communication range of the short-range communication device 2, and authentication and access control protocols are executed between the short-range communication device 2 and the mobile communication apparatus 1 or its processor 14 or virtual card 141, respectively, as described above in the context of step S4. As part of the authentication and access control of step S13, the mobile communication apparatus 1 or its processor 14 or virtual card 141, respectively, is authenticated as a "locator device" authorized to set the device location 211 of the short-range communication device 2.

In step S14, upon successful authentication and authorization, the short-range communication device 2 or its processor 22, respectively, generates a location inquiry, e.g. as part of a setup or configuration procedure.

In step S15, the location inquiry is transmitted from the short-range communication device 2 to the mobile communication apparatus 1 via the short-range communication circuits 13, 23.

In step S16, using the apparatus location determination circuit 12, the processor 14 of the mobile communication apparatus 1 determines its current location (in case of a dead spot, the available location determined last is used).

In step S17, the processor 14 (or the virtual card 141, respectively) generates and transmits to the short-range communication device 2 a location inquiry response via the short-range communication circuits 13, 23. The location inquiry response includes the determined current apparatus location, preferably in a secured fashion (encrypted).

In step S18, the processor 22 receives the location inquiry response and stores the received apparatus location as the device location 211 of the short-range communication device 2 in the secured data store 21.

Subsequently, the device location 211 is used to verify the terminals access authorization based on correspondence of terminal and apparatus location, as described above in the context of step S8.

Figure 4:
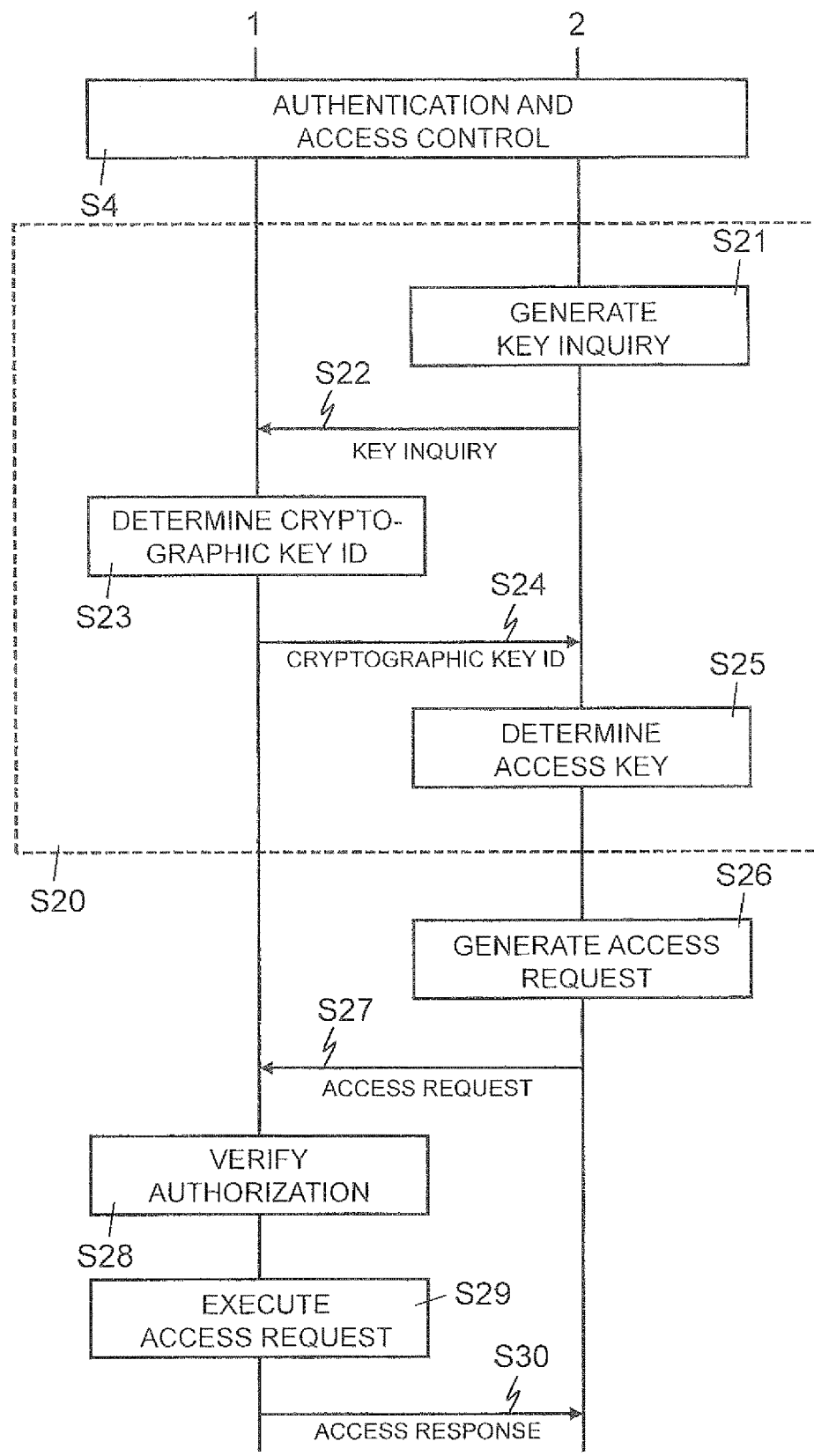
FIG. 4 shows a flow diagram illustrating an exemplary sequence of steps for controlled access of a short-range communication device to a mobile communication apparatus.

FIG. 4 illustrates an exemplary sequence of steps for controlled access of the short-range communication device 2 to the mobile communication apparatus 1.

As described above, in step S4, the mobile communication apparatus 1 is within the communication range of the short-range communication device 2, and authentication and access control protocols are executed between the short-range communication device 2 and the mobile communication apparatus 1 or its processor 14 or virtual card 141, respectively.

In step S20, upon successful authentication and authorization, the short-range communication device 2 or its processor 22, respectively, determines the cryptographic access key 213 for accessing the mobile communication apparatus 1 or its applications 142 or virtual card 141, respectively. The short-range communication device 2 has stored one or more cryptographic access keys 213, which are application and/or provider specific. The purpose of the key inquiry is to identify the cryptographic access key 213 that the short-range communication device 2 is to use in a subsequent access request, e.g. read/write requests, application interactions, transactions, sessions, etc., with the mobile communication apparatus 1, its applications 142 or its virtual card 141, respectively.

Specifically, in step S21, the short-range communication device 2 or its processor 22, respectively, generates a key inquiry.

In step S22, the key inquiry is transmitted from the short-range communication device 2 to the mobile communication apparatus 1 via the short-range communication circuits 13, 23.

In step S23, the mobile communication apparatus 1, i.e. the processor 14 or the virtual card 141, respectively, determines the cryptographic access key $k_i$ that is to be used by the short-range communication device 2 in the current transaction or session with the mobile communication apparatus 1, its applications 142 or its virtual card 141, respectively. The processor 14, determines a key identifier $K_{IDi}$ for the identified cryptographic access key $k_i$. The key identifier $K_{IDi}$ is generated from the identified cryptographic access key $k_i$ using a cryptographic one-way function h, that is, a function which is infeasible or extremely difficult to invert, for example a cryptographic hash function, $K_{IDi}=h(k_i)$. Depending on the embodiment, key identifier $K_{IDi}$ is pre-generated (e.g. in the computer system 4) and stored in the mobile communication apparatus 1, e.g. in a key identifier table, or the key identifier $K_{IDi}$ is generated "on the go" in the mobile communication apparatus 1, provided the cryptographic access key $k_i$ are actually available and securely stored in the mobile communication apparatus 1.

In step S24, the processor 14 (or the virtual card 141, respectively) generates and transmits to the short-range communication device 2 a key inquiry response via the short-range communication circuits 13, 23. The key inquiry response includes the generated key identifier $K_{IDi}$.

In step S25, the processor 22 receives the key inquiry response and compares the received key identifier $K_{IDi}$ to key identifiers $K_{IDn}$ of the cryptographic access keys $k_n$ 213 stored in the secured data store 21 of the short-range communication device 2. The key identifiers $K_{IDn}$ of the cryptographic access keys $k_n$ 213 are derived from the cryptographic access keys $k_n$ 213 using the same cryptographic one-way function h, $K_{IDn}=h(k_n)$. Preferably, the key identifiers $K_{IDn}$ of the cryptographic access keys 213 are "pre-calculated" and stored in in the secured data store 21 linked to the respective cryptographic access key $k_n$ 213.

In step S26, upon successful identification $K_{IDi}=K_{IDn}$ of the cryptographic access key $k_i$, the short-range communication device 2 or its processor 22, respectively, generates an access request, using the identified access key $k_i$.

In step S27, the access request is transmitted from the short-range communication device 2 to the mobile communication apparatus 1 via the short-range communication circuits 13, 23.

In step S28, the mobile communication apparatus 1, i.e. the processor 14 or the virtual card 141, verifies legitimacy or authorization of the access request based on the cryptographic access key $k_i$ specified to the short-range communication device 2 in the key inquiry response of step S24 with the key identifier $K_{IDn}$. In an embodiment, for increased security, the mobile communication apparatus 1, i.e. the processor 14 or the virtual card 141, further verifies legitimacy or authorization of the access request by performing the location and/or time based authorization verification described above in the context of step S8.

In step S29, upon successful and positive authorization verification, the processor 14 (or the virtual card 141, respectively) executes the access request and generates an access request response. Depending on the scenario, the access request response includes a data response for an executed data read request, a write confirmation for an executed data write request, a transaction response for an executed transaction request, an application response for an executed application interaction request, a session response for an executed session request, etc.

In step S30, the processor 14 (or the virtual card 141, respectively) transmits the access request response to the short-range communication device 2 via the short-range communication circuits 13, 23. In an embodiment, the processor 22 verifies legitimacy or authorization of the mobile communication apparatus 1 or its processor 14 or virtual card 141, respectively, by performing the location and/or time based authorization verification described above in the context of step S90. Thus, correspondence of apparatus time and/or location with device time and/or location, is not only applied for transferring secured data packages for configuration or key distribution purposes, but also for any other operational interaction and data exchange between the mobile communication apparatus 1 and the short-range communication device 2.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the disclosure.

What is claimed is:

1. A mobile communication apparatus, comprising:
   a first circuit configured for data communication via a mobile radio network;
   a second circuit configured for short-range communication with a stationary short-range communication device;
   a third circuit configured to determine apparatus location information, indicative of a current location of the mobile communication apparatus; and
   a processor connected to the first, second, and third circuits, and configured to:
   receive via the mobile radio network a secured data package from a computer system, to receive device location information from the stationary short-range communication device, wherein the device location information is representative of a programmed location of the stationary short-range communication device,
   to determine access authorization based on verifying correspondence of the device location information and the apparatus location information, determining affirmative access authorization in case of correspondence of the device location information and the apparatus location information, and determining negative access authorization in lack of correspondence of the device location information and the apparatus location information, and
   to transfer the secured data package to the stationary short-range communication device, in case of affirmative access authorization, and to not transfer the secured data package to the stationary short-range communication device, in case of negative access authorization.

2. The mobile communication apparatus of claim 1, wherein the secured data package comprises executable program code; and the processor is configured to transfer the secured data package comprising the executable program code to the stationary short-range communication device, in case of affirmative access authorization.

3. The mobile communication apparatus of claim 1, wherein the secured data package has a hierarchical and/or nested structure, whereby the secured data package, accessible by way of a first decryption key, includes a secured data sub-package, accessible by way of a different second decryption key; and the processor is configured to transfer the secured data package having the hierarchical and/or nested structure to the stationary short-range communication device, in case of affirmative access authorization.

4. The mobile communication apparatus of claim 1, wherein the secured data package comprises a target location; and the processor is configured to store the secured data package from the computer system in the mobile communication apparatus, to determine whether the mobile communication apparatus has stored a secured data package with a target location matching the device location information from the stationary short-range communication device, to determine affirmative access authorization in case of correspondence of the device location information, the target location and the apparatus location information, and to determine negative access authorization in lack of correspondence of the device location information, the target location and the apparatus location information.

5. The mobile communication apparatus of claim 1, wherein the secured data package comprises encrypted content including encrypted cryptographic access keys and/or access rights, decryptable by a recipient with a secret decryption key; and the processor is configured to transfer the secured data package with the encrypted cryptographic access keys and/or access rights to the stationary short-range communication device for decryption with the secret decryption key, in case of affirmative access authorization.

6. The mobile communication apparatus of claim 1, wherein the device location information is received from the stationary short-range communication device included in a data read request; and the processor is configured to reject the read request, in case of negative access authorization.

7. The mobile communication apparatus of claim 1, wherein the processor is configured to further receive device time information from the stationary short-range communication device, to determine the access authorization further based on verifying correspondence of the device time information and time information stored in the mobile communication apparatus, determining affirmative access authorization in case of correspondence of the device time information and time information stored in the mobile communication apparatus, and determining negative access authorization in lack of correspondence of the device time information and time information stored in the mobile communication apparatus.

8. The mobile communication apparatus of claim 1, wherein the secured data package includes at least one of: configuration data for the stationary short-range communication device, and time information; and the processor is configured to transfer the secured data package in case of affirmative access authorization, and to not transfer the secured data package to the stationary short-range communication device, in case of negative access authorization.

9. The mobile communication apparatus of claim 1, wherein the processor is configured to execute authentication and access control protocols, which govern authentication and access control between the mobile communication apparatus and the stationary short-range communication device, for accessing the stationary short-range communication device to set the device location information in the stationary short-range communication device, and, in case of affirmative authentication and access control, to use the apparatus location information to set the device location information in the stationary short-range communication device.

10. A stationary short-range communication device, comprising:
a circuit configured for short-range communication with a mobile communication apparatus;
a secured data store storing device location information representative of a programmed location of the stationary short-range communication device, and
a processor connected to the circuit, and configured:
to receive from the mobile communication apparatus a secured data package, the secured data package including apparatus location information, indicative of a current location of the mobile communication apparatus,
to determine access authorization based on
verifying correspondence of the device location information and the apparatus location information received from the mobile communication apparatus,
determining affirmative access authorization in case of correspondence of the device location information and the apparatus location information, and
determining negative access authorization in lack of correspondence of the device location information and the apparatus location information, and
to store, in the stationary short-range communication device, the secured data package received from the mobile communication apparatus, in case of affirmative access authorization, and to reject the secured data package, in case of negative access authorization.

11. The stationary short-range communication device of claim 10, wherein the secured data package comprises executable program code; and the processor is configured to determine and store, in the short-range communication device, the executable program code included in the secured data package received from the mobile communication apparatus, in case of affirmative access authorization.

12. The stationary short-range communication device of claim 10, wherein the secured data package has a hierarchical and/or nested structure, whereby the secured data package, accessible by way of a first decryption key, includes a secured data sub-package, accessible by way of a different second decryption key; and the processor is configured to use the first decryption key to access the secured data package received from the mobile communication apparatus, and to use the second decryption key to access the secured data sub-package included in the secured data package, in case of affirmative access authorization.

13. The stationary short-range communication device of claim 10, wherein the secured data package comprising encrypted content including encrypted cryptographic access keys and/or access rights, decryptable by a recipient with a secret decryption key; and the processor is configured to use the secret decryption key to decrypt the encrypted content included in the secured data package received from the mobile communication apparatus and store, in the stationary short-range communication device, the cryptographic access keys and/or access rights, in case of affirmative access authorization.

14. The stationary short-range communication device of claim 10, wherein the processor is configured to receive from the mobile communication apparatus time information, to determine the access authorization further based on verifying correspondence of device time information stored in the stationary short-range communication device and the time information received from the mobile communication apparatus, determining affirmative access authorization in case of correspondence of the device time information and the time information received from the mobile communication apparatus, and determining negative access authorization in lack of correspondence of the device time information and the time information received from the mobile communication apparatus.

15. The stationary short-range communication device of claim 10, wherein the processor is configured to execute authentication and access control protocols, which govern authentication and access control between the stationary short-range communication device and the mobile communication apparatus, for accessing the stationary short-range communication device to set the device location information in the stationary short-range communication device, and, in case of affirmative authentication and access control, to receive from the mobile communication apparatus the apparatus location information, and to set the device location information in the stationary short-range communication device using the apparatus location information.

16. A method of transmitting a secured data package from a computer system to a stationary short-range communication device, the method comprising:
    transmitting the secured data package from the computer system via a mobile radio network to a mobile communication apparatus;
    placing the mobile communication apparatus in a communication range of the stationary short-range communication device;
    determining an access authorization based on verifying correspondence of apparatus location information, indicative of a current location of the mobile communication apparatus, and device location information, representative of a programmed location of the stationary short-range communication device, stored in the stationary short-range communication device, determining affirmative access authorization in case of correspondence of the apparatus location information and the device location information, and determining negative access authorization in lack of correspondence of the apparatus location information and the device location information, and
    in case of affirmative access authorization, transferring the secured data package to the stationary short-range communication device.

17. The method of claim 16, wherein the secured data package comprises executable program code; and the method further comprises determining and storing, in the stationary short-range communication device, the executable program code included in the secured data package received from the mobile communication apparatus, in case of affirmative access authorization.

18. The method of claim 16, wherein the secured data package has a hierarchical and/or nested structure, whereby the secured data package, accessible by way of a first decryption key, includes a secured data sub-package, accessible by way of a different second decryption key; and the method further comprises using the first decryption key in the stationary short-range communication device to access the secured data package received from the mobile communication apparatus, and using the second decryption key in the stationary short-range communication device to access the secured data sub-package included in the secured data package, in case of affirmative access authorization.

19. The method of claim 16, wherein the secured data package comprises a target location; and the method further comprises determining in the mobile communication apparatus whether the mobile communication apparatus has stored a secured data package with a target location matching device location information from the stationary short-range communication device; determining affirmative access authorization in case of correspondence of the apparatus location information, the target location and the device location information; and determining negative access authorization in lack of correspondence of the apparatus location information, the target location and the device location information.

20. The method of claim 16, wherein the secured data package comprises encrypted content including encrypted cryptographic access keys and/or access rights, decryptable by a recipient with a secret decryption key; and the method further comprises transferring the secured data package with the encrypted cryptographic access keys and/or access rights to the stationary short-range communication device, the stationary short-range communication device using the secret decryption key to decrypt the encrypted content included in the secured data package received from the mobile communication apparatus, and storing the cryptographic access keys and/or access rights in the stationary short-range communication device, in case of affirmative access authorization.

21. A mobile communication apparatus, comprising:
    a first circuit configured for data communication via a mobile radio network;
    a second circuit configured for short-range communication with a short-range communication device; and
    a processor connected to the first circuit and the second circuit, and configured to receive via the mobile radio network a secured data package from a computer system, the secured data package having a hierarchical and/or nested structure, whereby the secured data package, accessible by way of a first decryption key, includes a secured data sub-package, accessible by way of a different second decryption key, and the secured data package comprises encrypted content including at least one of encrypted cryptographic access keys, access rights, and executable program code, decryptable by a recipient with a secret decryption key; and the processor is further configured to execute authentication and access control protocols, which govern authentication and access control between the mobile communication apparatus and the short-range communication device, using one or more secret access keys and/or access rights, and to transfer the secured data package comprising the executable program code to the short-range communication device, in case of affirmative access authorization, and to not transfer the secured data package to the short-range communication device, in case of negative access authorization.

22. A short-range communication device, comprising:
    a circuit configured for short-range communication with a mobile communication apparatus; and
    a processor connected to the circuit, and configured to receive from the mobile communication apparatus a secured data package, the secured data package having a hierarchical and/or nested structure, whereby the secured data package, accessible by way of a first decryption key, includes a secured data sub-package, accessible by way of a different second decryption key, and the secured data package comprises encrypted content including at least one of encrypted cryptographic access keys, access rights, and executable program code, decryptable by a recipient with a secret decryption key; and the processor is further configured to execute authentication and access control protocols, which govern authentication and access control between the mobile communication apparatus and the short-range communication device, using one or more secret access keys and/or access rights, to reject the secured data package, in case of negative access authorization, and, in case of affirmative access authorization, to use the first decryption key to access the secured data package received from the mobile communication apparatus, to use the second decryption key to access the secured data sub-package included in the secured data package, and to determine and store in the short-range communication device at least one of the executable program code, the cryptographic access keys or access rights, included in the secured data package received from the mobile communication apparatus.

\* \* \* \* \*